United States Patent [19]

McGookin

[11] 4,276,774
[45] Jul. 7, 1981

[54] METHOD AND APPARATUS FOR MEASURING THE LEVEL OF SEMI-SOLID MATERIAL

[75] Inventor: Hugh R. McGookin, 9455 S. Friendly Woods La., Whittier, Calif. 90605

[73] Assignee: Hugh R. McGookin, Whittier, Calif.

[21] Appl. No.: 46,785

[22] Filed: Jun. 8, 1979

[51] Int. Cl.³ .............................................. G01F 23/20
[52] U.S. Cl. ..................................... 73/290 B; 73/296
[58] Field of Search ................. 73/296, 290 R, 290 B, 73/314, 305, 321; 33/126.5, 126, 126.6, 125 R

[56] References Cited

U.S. PATENT DOCUMENTS

| | | | |
|---|---|---|---|
| 1,391,504 | 9/1921 | Renkin | 33/126.5 |
| 1,483,131 | 2/1924 | Tausz | 73/321 |
| 1,838,018 | 12/1931 | Furlong | 33/125 R |
| 2,029,405 | 2/1936 | Beadle | 73/309 |
| 2,700,222 | 1/1955 | Swenson | 73/321 |
| 3,099,158 | 7/1963 | Barker | 73/321 |
| 3,140,609 | 7/1964 | Mayes | 73/321 |
| 3,629,946 | 12/1971 | Parsons | 73/321 |
| 3,742,307 | 6/1973 | Patsch | 73/321 |
| 4,188,726 | 2/1980 | Wemyss | 73/321 |

FOREIGN PATENT DOCUMENTS

| | | | |
|---|---|---|---|
| 2833414 | 3/1979 | Fed. Rep. of Germany | 73/296 |
| 1405203 | 5/1965 | France | 73/321 |
| 609532 | 9/1960 | Italy | 73/305 |
| 438881 | 5/1978 | U.S.S.R. | 73/296 |

Primary Examiner—Gerald Goldberg
Assistant Examiner—Denis E. Corr
Attorney, Agent, or Firm—Christie, Parker & Hale

[57] ABSTRACT

A method and apparatus for measuring the level of containerized or free standing semi-solid material is disclosed. A substantially smooth uniform cable is suspended above and into the semi-solid material. A predetermined amount of slack is introduced into the cable. The slackened portion of the cable above the level of the semi-solid material is coupled to a weighing apparatus. The weighing apparatus weighs the slackened portion of the cable, the weight of such a portion being related to the amount of cable above the level of the material and thus an indication of the level of the material. Subsequent to a measurement, the cable is raised for uncoupling the cable from the weighing apparatus.

18 Claims, 9 Drawing Figures

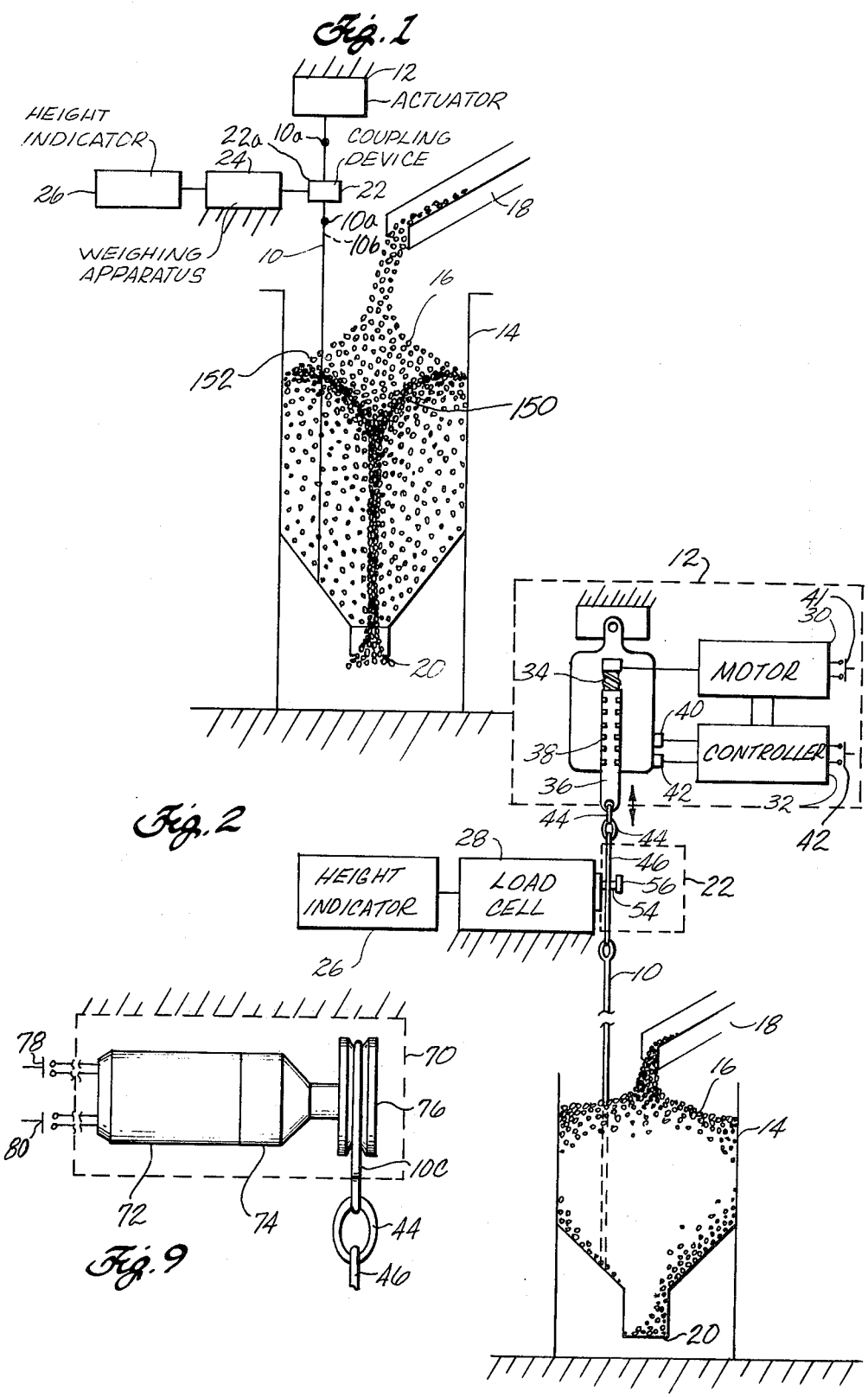

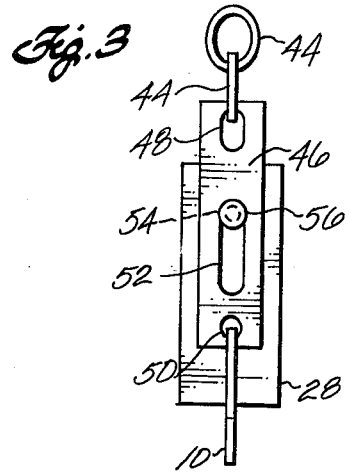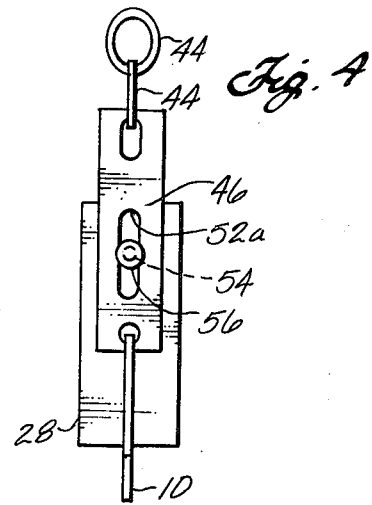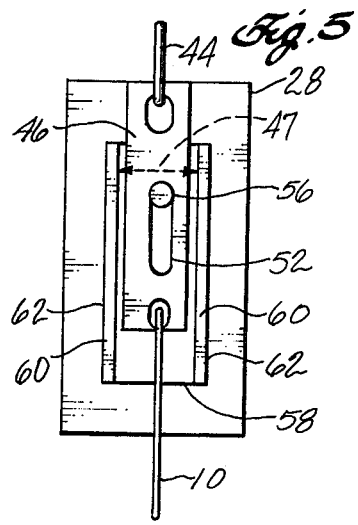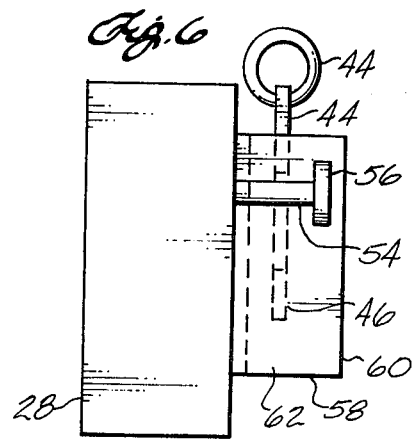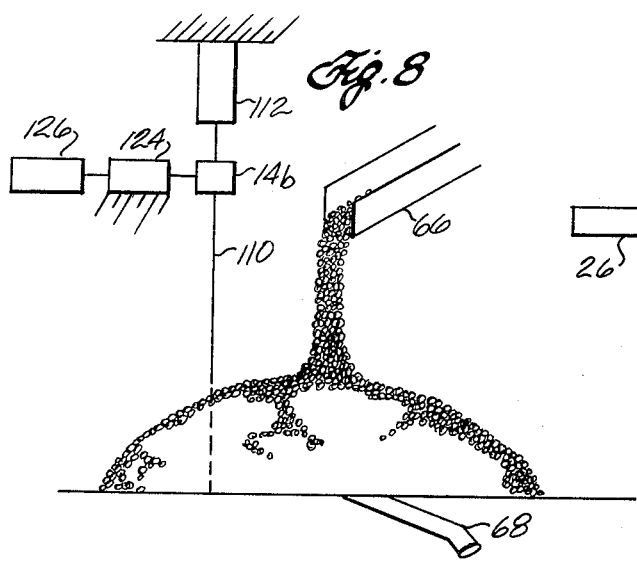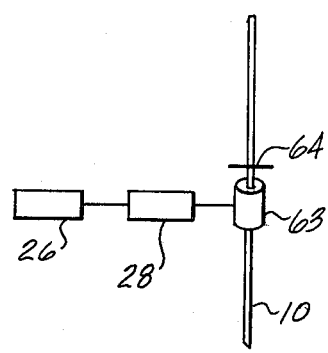

METHOD AND APPARATUS FOR MEASURING THE LEVEL OF SEMI-SOLID MATERIAL

BACKGROUND OF THE INVENTION

This invention relates to a method and apparatus for measuring and more particularly a method and apparatus for measuring the level of semi-solid material.

Apparatus are known for measuring the level of semi-solid material. The material may be stored in containers such as a closed bin or silo. Mechanical systems are typically employed to determine the level of the material in the containers. The systems usually have a bell or funnel-shaped member, attached to one end of a chain, that is lowered within the container for contacting the surface of the material. Upon contact of the member with the material surface, an indicator attached to the other end of the chain provides visual indication of the level of the material in the container.

One type of prior art measuring device is disclosed in Renkin in U.S. Pat. No. 1,391,504. A conical-shaped block is attached by means of a straight bar and a chain to a manually-operated handle. The handle has an indicator that moves along a height-indicating scale. The chain turns about a sheave located above the container (bin) such that a downward pull on the handle causes the raising of the block within the bin. When it is desirous to determine the level of the material in the bin, an operator pulls the handle downward to a station wherein the block is suspended freely within the bin. The handle is released slowly, and the operator senses the point at which the block contacts the level of the material. At such a point, the level of the material is read from the scale.

The device described in Renkin, however, suffers from several practical problems in that the device must be manually operated, and the block must be in a totally raised position when the bin is being filled with the semi-solid material. In grain storage yards having many silos, for example, manual operation of such measuring devices would be very time consuming, and therefore costly.

Bins using Renkin's device could not be filled while the block is in the lowered position since the weight of the semi-solid material covering the block would prevent it from being raised without excessive force and potential rupture of the cable.

Renkin also describes a tubular member attached to the upper surface of the closed bin for guiding therein the rod attached to the block. Thus, the tubular extension is of a length in the same order as the height of the bin, a highly impractical situation when considering today's storage bins having heights in the order of 125 feet.

Another prior art device is disclosed by Parsons in U.S. Pat. No. 3,629,946. Parsons describes a level measuring device for a container of bulk material. Parsons discloses a reel mechanism coupled to a digital counter, and a weighted bell supporting line that is entrained over sheaves carried by framework on a silo. When it is desired to determine the level of the bulk material in the container, the reel is manually unwound until the bell contacts the material in the container. At such time, the digital counter is read out for conversion to a height indication. Upon completion of the measurement, the reel is rewound, thus, returning the bell to the top of the container where it is locked into place in preparation for a subsequent measurement. Parsons discloses use of plural lines, each line attached to a corresponding container. The reel mechanism and digital counter may be used in conjunction with plural lines so that material level measurement in several containers can be accomplished with the reel mechanism temporarily located at a specific station. As in the other prior art device described, the bell is manually lowered into the container for contacting the surface of the material contained therein. Additionally, the bell must be raised to a position at the top of the silo prior to refilling the silo with the semi-solid material. Thus, Parsons suffers from the same deficiencies as the other prior art device in that manual operation in raising and lowering the bell and its attendant time consumption are present.

Additionally, the use of weights, bells or blocks that are lowered to the surface of the material preclude the use of the measuring device during the unloading as well as loading of the material in the containers. The weight of the reloaded material above the bell would result in stress in the connecting lines causing them to break, and thus, the bell would be carried along with the material removed from the containers.

A device for measuring levels of fluids in containers is described by Beadle in U.S. Pat. No. 2,029,405. The device includes a plurality of serially-connected floats suspended from a spring-loaded height indicator located at the top of a fluid-holding container.

As the fluid in the container is removed, the next serially-connected float becomes suspended thereby causing its weight to be added to that priorly-sensed by the height indicator. The weight of the suspended floats therefore provides an indication of the level of the fluid in the container.

Operation of Beadle's devices relies principally upon the floatation characteristics of the floats upon the surface of the fluid and the weight of the floats suspended above the fluid surface. This technique is not suitable for measurement of semi-solid materials, however, since the floats not suspended would not rest upon the material surface and the downward pull of the material on the floats, that become imbedded within the material, causes inaccurate level measurements as well as potential rupture of the float-suspending cable.

SUMMARY OF THE INVENTION

The problems and deficiencies of the prior art are overcome with an embodiment of the present invention.

Briefly, an embodiment of the present invention is an apparatus for measuring the level of semi-solid material. The apparatus has a substantially smooth uniform cable. Means is provided for suspending the cable vertically into the semi-solid material and for introducing slack into the cable. A weighing apparatus is coupled to the cable when the cable is in a slackened condition causing the weighing apparatus to weigh the slackened portion of the cable above the level of the semi-solid material.

The cable is suspended in the container from the top to a station in the vicinity of the bottom of the container. In the unslackened condition, the downward pull of the material within the container on the cable causes the cable to be in a taut condition throughout the height of the container. When it is desired to measure the level of the material, a predetermined amount of slack is introduced into the portion of the cable above the level of the semi-solid material by lowering the upper end of the cable a predetermined amount. The material supports the weight of the cable below its surface such that the means for suspending the cable supports only that portion of the cable that is slack and that which lies above the level of the semi-solid material. The weight of the cable above the level of the material is coupled to the weighing apparatus. Since the weight of the cable thus measured is proportional to its height above the level of the semi-solid material, the level of the material is directly calculatable. Upon completion of the measurement, the upper end of the cable is raised back to its initial position ready for future lowering and weighing. Since a substantially smooth cable is used, the downward pull of the material within the container is less than that which would cause a rupture of the cable.

BRIEF DESCRIPTION OF THE DRAWINGS

FIG. 1 is a schematic and block diagram of an apparatus for measuring the level of semi-solid material in combination with a grain silo and embodies the present invention. Grain in the silo forms the semi-solid material to be measured;

FIG. 2 is a schematic and block diagram of a preferred apparatus for measuring the level of semi-solid material in combination with a silo and embodies the present invention;

FIG. 3 is a front view of the coupler of FIG. 2 in the coupled position;

FIG. 4 is a front view of the coupler of FIG. 2 in the uncoupled position;

FIG. 5 is a front view of an alternate coupler for use in the apparatus of FIG. 2 including a U-shaped guide bracket for the coupler;

FIG. 6 is a side view of the coupler of FIG. 5;

FIG. 7 is a perspective view of an alternate coupler for use in the apparatus of FIG. 2;

FIG. 8 is a schematic and block diagram of an apparatus for measuring the level of semi-solid material in combination with an uncontained pile of semi-solid material and embodying the present invention; and FIG. 9 is a schematic and block diagram of an alternate actuator for use in the apparatus of FIG. 2.

DETAILED DESCRIPTION

Refer now to the embodiment of the invention depicted in FIG. 1. A cable 10 is suspended from its upper end by means of actuator 12 in a silo container 14 containing semi-solid material 16 in the form of grain. The material 16 is introduced into the container 14 at the top, for example by chute 18, and the material is removed from the container at the bottom by means outlet 20. Coupled to the cable 10 by means of coupling device 22 is weighing apparatus 24. Connected to the weighing apparatus 24 is a height indicator 26. The actuator holds the upper end 10a of the cable 10 at a fixed position. However, the semi-solid material, as it is loaded and dispersed, exerts a strong downward pull on the cable 10. Thus, if the cable were weighed under these conditions, the downward pull of the cable would have no direct relation to the length of the cable above the semi-solid material, and hence, the level of the semi-solid material. Accordingly, when it is desired to measure the level of the material within the container, a selected amount of slack is introduced into the cable by lowering the upper end 10a of the cable a predetermined distance, for example, to the upper side 22a of the coupling device 22. During the slackened condition, the cable is coupled to the weighing apparatus by means of the coupling device. The material within the container supports that portion of the cable imbedded within the material so that in the slackened position the weighing apparatus weighs the cable that extends between the coupling device and the level of the material. For a substantially uniform cable, the weight of the cable is directly related to its length. Thus, the weight of the cable above the level of the material is a direct indication of the level of the material. Thus, by appropriate numerical conversion, the weight of the cable, as measured by the weighing apparatus, is converted by the height indicator 26 to give visual indication of the height of the material within the container.

FIG. 2 is a schematic of the presently-preferred embodiment of the invention. Cable 10 is formed preferably from uniformly stranded galvanized or stainless steel having tensile strengths in the order of about 4000 lbs. Preferably, the cable is about 5/32 of an inch in diameter, and is coated with a smooth plastic material such as polyvinyl chloride (PVC) to minimize the drag or downward pull by the semi-solid material on the cable portion imbedded within the material.

Additionally, the apparatus herein described, having a cable utilizing such a coating, is unaffected by humidity, temperature, dust, and density and weight of the material. The materials include, but are not limited to, such semi-solids such as coal, cement, grain, wheat, sugar and milo.

The actuator 12 includes a motor 30, a motor controller 32, a threaded motor-controlled nut 34 that engages arm 36 having screw threads 38 that correspond to the pitch of the screw threads in nut 34. Limit switches 40 and 42 act as upward/downward motion limit switches such that movement of the arm 36 is within a predetermined range. An example of two suitable actuators are the Warner Electric Linear Actuators Model Nos. ACA-PC or ACB-JB. Linear actuators of this type are characterized in that the arm remains in place when the motor is de-energized, thereby ensuring that the cable remains static even though a strong downward pull is exerted on the cable and hence the arm 36.

The arm 36 is connected to a coupler 46 by means of connector rings 44. Coupler 46 forms part of the coupling device 22.

Referring now to FIGS. 3 and 4, there is shown the coupler 46 in the coupled and uncoupled position, respectively. The coupler 46 is formed preferably from flat metal bar stock. The coupler has an opening 48 at the upper end, as seen in FIG. 3, for receiving one of the connector rings 44. The lower end of the coupler 46 has opening 50 connected to the upper end of the cable. Intermediate the ends of the coupler 46 is a vertically elongated slot 52.

Means is provided in the form of a rod 54 (see FIG. 6) coupled to the load input of load cell 28 for coupling the weight of the slackened portion of the cable to the load cell input. Rod 54 extends from the load cell through slot 52 of the coupler and forms a second part of the coupling device 22. The rod 54 has an expanded head 56 such that the coupler is confined to movement between the load cell and the expanded head 56.

As shown in FIG. 3, the coupler is in the lowered position such that the weight of the cable 10 is coupled by means of the coupler to the rod 54 due to contact of the rod with the upper end 52a of the slot 52. Thus, the weight of the cable is transferred to the load cell input for measurement thereby. In the raised position, the coupler 46 is moved in an upward direction until the upper end 52a of slot 52 is disengaged from rod 54, as shown in FIG. 4, such that the rod 54 no longer supports the weight of the cable.

The movement of coupler 46 thus is in a vertical direction with respect to the rod 54. The preferred embodiment provides about 8 inches of movement to the upper end of the cable.

Briefly, the operation of the apparatus of FIG. 2 is as follows. As the semi-solid material is dispensed by chute 18 and is dispensed out of the bottom of container 14, the semi-solid material exerts a downward pull on the cable 10. To make a measurement and determine the level of semi-solid material, control switch 41 is actuated, causing the controller 32 to energize motor 30, causing the arm 36 to move downward a predetermined distance until lower limit switch 42 is actuated. When lower limit switch 42 is actuated, the controller 32 de-energizes motor 30, causing the downward movement of the arm 36 to terminate. During the downward movement of the arm 36, the coupler 46 is moved from the position depicted in FIG. 4 to the position depicted in FIG. 3 where the upper end 52a of slot 52 engages and rests on the arm 54, and the load cell 28 measures the weight of the cable 10 suspended above the semi-solid material 16, and the height indicator 26 indicates the height of the semi-solid material.

To return the cable to its initial upper position, switch 43 is actuated causing controller 32 to energize motor 30 and drive arm 36 upward back to its initial upper position. When arm 36 reaches its initial upper position, upper limit switch 40 is actuated by the arm 36 and causes controller 32 to de-energize motor 30 and stop the upward movement of arm 36.

The actuator 12 may also be formed of a winch (see FIG. 9) connected to coupling device 22.

The winch 70 includes electric motor 72 connected to a gearbox 74. The gearbox is connected to pulley 76 about which is wound a portion 10c of cable 10. Included within the winch is wind command switch 78 and unwind command switch 80, as well as upper and lower limit switches (not shown).

Briefly, the operation of the apparatus is as follows. To make a measurement, unwind command switch 80 is activated thus energizing the motor causing the pulley, by means of the gearbox, to turn in an unwind direction. The cable is unwound a predetermined amount until the lower limit switch is activated thereby de-energizing the motor. As previously described, the coupler is moved downward so as to engage the arm 54 to thereby couple the weight of the cable above the level of the semi-solid material to the weighing apparatus.

After completion of the measurement, the wind command switch 78 is energized to rewind the cable on the pulley. The cable is rewound until the upper limit switch is activated terminating pulley rotation and returning the cable to its initial upper position.

In the embodiments of FIGS. 5 and 6, load cell 28 includes a U-shaped channel bracket 58 having parallel legs or sides 62 between which the coupler 46 slides and is guided. The sides 62 have ends 60 that extend beyond rod head 56. The opposite sides 46b and 46c of coupler 46 are parallel and separated by a width 47. The inside distance between sides 62 of the bracket 58 is marginally larger than the width 47 of the coupler 46 so that horizontal movement of the coupler within the bracket will be confined between the sides, thus minimizing any horizontal movement of the coupler, and thus minimizing stressing of the load cell input.

As illustrated in FIG. 1, the profile of the surface of the material in a container forms a flared conical surface 150 (apex downward) when the material is being discharged, and a domed surface 152 when the material is being introduced. A station, located on a diameter of the silo about one-third the diameter distance from the silo wall, is characterized in that the surface height at such a station is approximately equal to the level of the material in the container having a flat surface profile. Preferably, the coupler and cable are positioned so that the cable is suspended vertically through such a station thus providing an accurate measurement.

Cables having a diameter of about 5/32 of an inch and formed of stranded stainless steel, weigh, for a length of about 125 feet, about 4 lbs. Thus, a load cell having a range in measurement of up to 4 lbs. is suitable for such weighing apparatus for a cable length of 125 feet.

Height indicator 26 may be any one of several readout devices, and preferably, it is a digital volt-meter (DVM). The DVM may be calibrated in feet such that the output of the load cell representing the weight of the cable is converted directly into feet (level of material).

The DVM may be coupled to a plurality of containers by suitable switching or multiplexing circuitry so that one DVM can provide height indication for a number of silo containers.

The weighing apparatus may also be formed of a conventional spring scale attached to rod 54. Upon coupling of the slackened portion of the cable to the scale, the scale indicator is deflected to a position corresponding to the weight of the cable. The scale face may be calibrated in feet to directly provide a measurement of material level.

The embodiment of FIG. 7 illustrates an alternate embodiment of the coupling means. A collar or tubular ring 63 is coupled to the rod 54 forming the load input of load cell 28. Cable 10, having a stop 64, passes through the ring 63. The stop 64 is attached to the cable above the ring 63 so that in a raised position the stop is out of contact with the ring thereby uncoupling the cable from the load cell. In a lowered position, the stop 64 contacts the ring 63, and thus the weight of the cable below the stop is transferred by means of the ring to the load input of load cell 28.

In the embodiment of FIG. 8, the apparatus for measuring the level of semi-solid material is employed for measuring the height of an uncontained pile of material such as coal. Material, supplied for example by a chute 66, forms a pile as shown in FIG. 8. The pile is supported by a free surface such as a building floor or the ground. Means are provided such as spout 68 for drawing the material from the bottom of the pile. A cable 110 is suspended above the pile by means of actuator 112. The actuator may be anchored to either a structure such as the ceiling of a building, or a boom, or crane. Connected to the cable 110 is a coupling device 146. The coupling device 146 is also connected to the load input of a weighing apparatus 124. Height indicator 126 connected to the weighing apparatus provides visual indication of the height of the pile as provided by the weighing apparatus. Height indicator 126, weighing apparatus 124, actuator 112, coupling device 146, and cable 110 are preferably the same as elements 26, 28, 12, 22 and 10 of FIGS. 1 and 2.

In a slackened condition, the coupling device couples the weight of the cable between the device and the level of the material to the weighing apparatus. The weighing apparatus weighs the length of the cable above the level of the material, and thus by appropriate conversion, the weight of the cable gives a measurement of the level of the material in the pile.

When the cable is initially placed in contact with the pile, the lower portion of the cable will be supported by the upper surface of the pile such that measurement would accurately result from performing the measuring method. As material is subsequently added to the pile and drawn from the pile, the bottom portion of the cable is progressively moved deeper within the pile until the length of the cable is in a substantially vertical position as depicted. No loss of accuracy, however, would occur during the movement of the end of the cable through the pile.

Significantly, the method and apparatus relies on measurement of solely the slackened portion of the cable above the pile such that the actual location of the lower end of the cable is immaterial.

Although an exemplary embodiment of the invention has been disclosed for purposes of illustration, it will be understood that various changes, modification and substitutions may be incorporated into such embodiment without departing from the spirit of the invention as defined by the claims appearing hereinafter.

What is claimed is:

1. Apparatus for measuring the level of semi-solid material comprising:
   a substantially uniform cable having a smooth outer coating for reducing drag on the cable;
   means for suspending the cable vertically into the semi-solid material and for selectively introducing slack in the cable;
   weighing apparatus; and
   means for coupling a slackened portion of the cable above the level of the semi-solid material to the weighing apparatus, causing the weighing apparatus to weigh the slackened portion of the cable.

2. Apparatus for measuring according to claim 1 wherein the means for suspending comprises an actuator for moving an upper end of the cable downward.

3. Apparatus for measuring according to claim 2 comprising control means for causing the actuator to move the cable down by a predetermined amount.

4. Apparatus for measuring according to claim 1 wherein the means for coupling comprises means for coupling and uncoupling the downward pull of the cable to the weighing apparatus, the coupling occurring when the cable is slackened and the uncoupling occurring when the cable is not slack.

5. Apparatus for measuring according to claim 4 wherein the coupling means comprises a first part connected to a weighing input of the weighing apparatus and a second part connected to the cable, the first part engaging the second part when the cable is slackened.

6. Apparatus for measuring according to claim 5 wherein the second part comprises a member having an elongated slot and the first part extends into the slot and engages an end of the slot when the cable is slack.

7. Apparatus for measuring according to claim 5 wherein the first part comprises a collar and the second part comprises a stop connected to the cable.

8. Apparatus for measuring according to claim 5 wherein the weighing apparatus includes load cell means coupled to the first part, said load cell means providing an output proportional to the weight of the slackened portion of the cable.

9. Apparatus for measuring according to claim 8 further including indicator means coupled to the load cell means for providing a visual indication of the weight of the slackened portion of the cable.

10. Apparatus for measuring according to claim 5 wherein the weighing apparatus includes scale means coupled to the first part, said scale means providing an output proportional to the weight of the slackened portion of the cable.

11. Apparatus for measuring according to claim 1 wherein the means for suspending the cable vertically into the semi-solid material and for selectively introducing slack in the cable comprises linear actuator means for lowering an upper end of the cable and for raising the upper end of the cable.

12. Apparatus for measuring according to claim 1 wherein the means for suspending the cable vertically into the semi-solid material and for selectively introducing slack in the cable comprises winch means, the cable being in the slackened condition when the winch means is in a lowered position and the cable being in the unslackened condition when the winch means is in a raised position.

13. The apparatus of claim 1 wherein the smooth outer coating is formed of plastic.

14. A method utilizing weighing apparatus for measuring the level of semi-solid material comprising the steps of:
   suspending a cable having a smooth outer coating vertically into the semi-solid material;
   selectively introducing slack in the cable above the semi-solid material;
   coupling a slackened portion of the cable above the semi-solid material to the weighing apparatus; and
   weighing the slackened portion of the cable.

15. The method for measuring according to claim 14 wherein the step of selectively introducing slack in the cable includes the step of moving an upper end of the cable a predetermined downward amount.

16. The method for measuring according to claim 14 wherein the step of coupling includes the steps of:
   coupling to the weighing apparatus the downward pull of cable when the cable is slackened; and
   uncoupling from the weighing apparatus the downward pull of the cable when the cable is not slack.

17. Apparatus for measuring the level of semi-solid material, the material having a level up to about 125 feet, the apparatus comprising:
   a substantially uniform cable having a smooth plastic coating and having a length of at least 125 feet;
   means for suspending the cable vertically into the semi-solid material and for selectively introducing slack in the cable;
   weighing apparatus; and
   means for coupling a slackened portion of the cable above the level of the semi-solid material to the weighing apparatus, causing the weighing apparatus to weigh the slackened portion of the cable.

18. Apparatus for measuring the level of semi-solid material comprising:
   a substantially uniform cable having a smooth plastic coating;
   means for suspending the cable vertically into the semi-solid material and for selectively introducing slack in the cable;
   weighing apparatus; and
   means for coupling a slackened portion of the cable above the level of the semi-solid material to the weighing apparatus, causing the weighing apparatus to weigh the slackened portion of the cable.

* * * * *